Dec. 3, 1946.  H. O. SHADE  2,412,013
COUPLING FOR DRIVE ROLLS
Filed Aug. 18, 1943
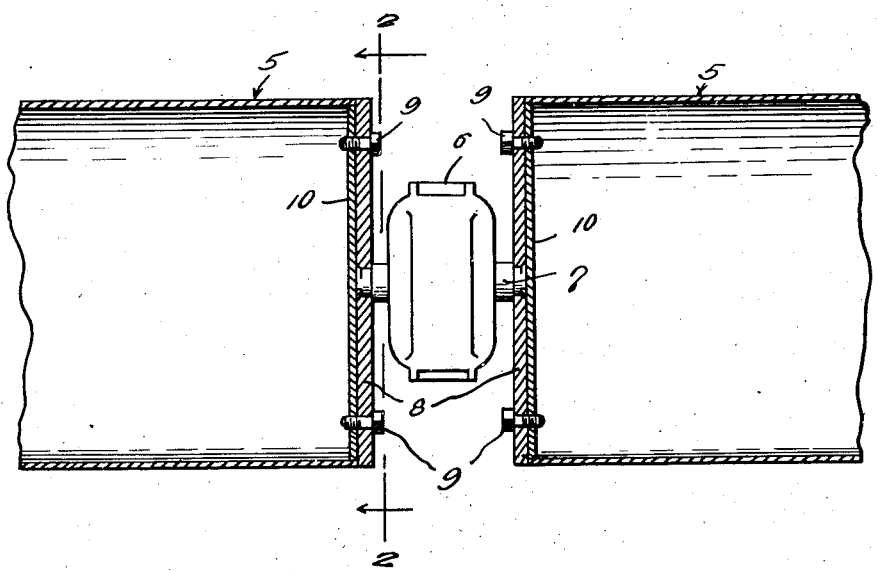
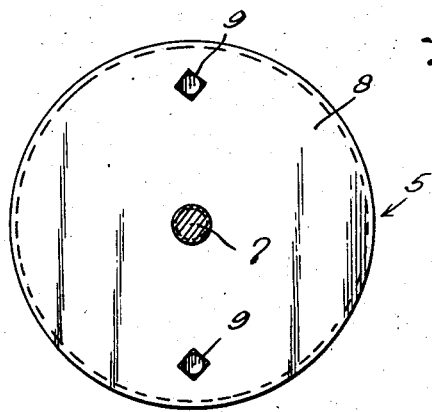
Inventor
Harley O. Shade,
By McMorrow & Berman
Attorneys Patented Dec. 3, 1946

2,412,013

UNITED STATES PATENT OFFICE 2,412,013

COUPLING FOR DRIVE ROLLS

Harley O. Shade, Martinsburg, W. Va.

Application August 18, 1943, Serial No. 499,131

2 Claims. (Cl. 64—1)

This invention relates to a coupling or connector for drive rolls of textile machines, such as spinning machines or mules and frequently termed "tin cylinders" in the trade. The primary object of the invention is the provision of a coupling or connector which will provide a positive connection between the drive rolls, and one wherein a large saving of time in the connecting and disconnecting of the drive rolls will be had and will eliminate the use of the long shaft now employed and which extends through and from end to end of the rolls.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a fragmentary vertical sectional view illustrating twin drive rolls of a textile machine connected in endwise relation by a coupling constructed in accordance with my invention.

Figure 2 is a sectional view taken on the line 2—2 of Figure 1.

Referring in detail to the drawing, the numeral 5 indicates fragmentary portions of axially aligned drive rolls used on textile machines, such as spinning machines or mules, and which are arranged in endwise axial relation and spaced from each other and usually connected together through the employment of a long shaft secured to said rolls and extending therethrough and from end to end thereof. The present mode of connecting the rolls requires a considerable amount of time and labor in the connection and disconnection thereof. To eliminate this loss of time and the use of a long shaft, the present invention is employed.

A bearing of a conventional construction is arranged between the rolls 5. The bearing is indicated by the character 6 and rotatably supports a comparatively short shaft 7, the ends of which have secured thereto attaching disk plates 8 having approximately the same diameter as the rolls 5 and are apertured to receive stud bolts 9 threaded into openings provided in the end walls 10 of the rolls. The plate disks 8 are preferably flush with the circumferential contour of the rolls while assembling and when assembled on the rolls 5. The stud bolts are arranged adjacent the peripheries or circumferences of the rolls and as the latter are spaced from each other, renders it comparatively easy to apply and remove the stud bolts when desiring to disconnect the rolls from each other or from the attaching plates thereby rendering a large saving in time and labor in the assembling and disassembling of the drive rolls.

Having thus described the invention, what I claim is:

1. The combination of axially aligned rolls of a textile machine, said rolls having opposed flat ends defining parallel planes, connecting means joining said opposed flat ends, said connecting means comprising a bearing, a shaft supported in said bearing, the ends of said shaft extending axially from said bearing, disk plates fixedly secured to the ends of said shaft, said disk plates located in parallel planes in a flush condition circumferentially of said rolls and flatly against said opposed flat ends, means detachably securing said disk plates to said parallel flat ends.

2. An article of manufacture comprising a connector for the adjacent opposed parallel flat end walls of axialy aligned rolls of a textile machine, said connector including a short shaft having a bearing means located intermediate the end portions thereof, a disk plate fixedly secured on each shaft end portion, said disk plates being parallel to each other and each provided with diametrically opposed apertures located intermediate the center and circumference of said disk plates whereby the disk plates may be detachably secured to the opposed parallel flat end walls of said axially aligned rolls, the outer surfaces of said disk being flat smooth and uninterrupted thereby providing for lateral insertion and lateral removal of said connector between adjacent rolls.

HARLEY O. SHADE.